(12) United States Patent
Tsai et al.

(10) Patent No.: US 7,742,687 B2
(45) Date of Patent: Jun. 22, 2010

(54) DIGITAL TELEVISION RECORDERS AND STREAM FORMAT CONVERSION AND METHODS THEREOF

(75) Inventors: Ching-Yu Tsai, Jhonghe (TW); Hua-Chun Hsieh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1424 days.

(21) Appl. No.: 11/086,543

(22) Filed: Mar. 22, 2005

(65) Prior Publication Data

US 2006/0215707 A1 Sep. 28, 2006

(51) Int. Cl.
*H04N 5/76* (2006.01)

(52) U.S. Cl. ........................................ 386/131; 348/441

(58) Field of Classification Search .................... 386/95, 386/109, 111, 112, 126, 131; 369/59.25; 370/464; 375/240.27; 348/441
See application file for complete search history.

(56) References Cited

U.S. PATENT DOCUMENTS

| | | | |
|---|---|---|---|
| 5,898,695 A * | 4/1999 | Fujii et al. | 370/464 |
| 6,169,843 B1 | 1/2001 | Lenihan | |
| 6,580,869 B1 | 6/2003 | Ando | |
| 6,873,629 B2 | 3/2005 | Morris | |
| 6,950,604 B1 | 9/2005 | Kato | |
| 6,987,767 B2 * | 1/2006 | Saito | 370/394 |
| 7,023,926 B2 * | 4/2006 | Matsuura et al. | 375/240.27 |
| 2001/0009548 A1 | 7/2001 | Morris | 370/392 |
| 2003/0103765 A1 * | 6/2003 | Sugahara et al. | 386/95 |
| 2004/0052191 A1 * | 3/2004 | Sako et al. | 369/59.25 |
| 2004/0252771 A1 | 12/2004 | Oishi | |
| 2005/0190763 A1 * | 9/2005 | Tomita | 370/389 |

FOREIGN PATENT DOCUMENTS

JP 11-45512 * 2/1999

OTHER PUBLICATIONS

Fujii et al., Machine Generated Translation of Japanese Patent Document #JP11-45512, Feb. 1999.*
TW Office Action mailed Jun. 16, 2009.

* cited by examiner

*Primary Examiner*—David E Harvey
(74) *Attorney, Agent, or Firm*—Thomas, Kayden, Horstemeyer & Risley

(57) ABSTRACT

Systems and methods for stream format conversion. A stream format conversion system converts data from a TS format to a PS format by selecting TS packets according to PID, filtering out TS headers and PES headers to obtain ES format data, and inserting PES and PS headers into the ES format data to generate PS packets.

26 Claims, 6 Drawing Sheets

DIGITAL TELEVISION RECORDERS AND STREAM FORMAT CONVERSION AND METHODS THEREOF

BACKGROUND

The invention relates to stream format conversion, more specifically to converting data from a transport stream (TS) format to a program stream (PS) format.

Techniques and applications for recording broadcast data on a hard disk of a digital television (TV) receiver or a set-top box (STB) have lately drawn much attention. Broadcast data, such as National Television System Committee (NTSC)/Phase Alternation by Line (PAL) type broadcast data, is encoded into a Moving Picture Experts Group (MPEG) stream by a multimedia encoder. The multimedia encoders provide data compression to allow video and audio data to be transferred, stored, and played in a computer environment. In MPEG systems, several types of multimedia information are combined into one stream that can be either transmitted on a single communication channel or stored in one file of a digital storage medium (DSM). MPEG has defined three types of non-elementary streams comprising program stream (PS), transport stream (TS), and packetized elementary stream (PES).

A program stream (PS) only carries one program, and is designed for applications having negligible transmission errors, for example, DSM or networks having correctable or negligible transmission errors. Packs of multiplexed audio and video data in a PS consist of pack headers followed by a variable number of multiplexed PES packets. A transport stream (TS) carries several programs, and is designed for applications having non-negligible transmission error. A TS also comprises multiplexed PES data. Specifically, variable length PES packets are typically packetized into shorter TS packets of fixed length (188 bytes) for transmission.

For digital data that is encoded in TS format for transmission, recording methods are known that directly record the transmitted digital data in the TS format such as onto a hard disk. The TS format data recorded on such hard disk, however, is difficult to modify or manage. Additionally, since the volume of data carried by the TS format data is relatively large, the limited capacity of the hard disk can become an issue to TS applications. Other recording methods solve the above drawbacks by first decoding the transmitted digital data that has encoded in TS. The decoded data is then encoded into PS for data storage. However, an MPEG encoding and decoding system is required for implementing such a method that typically increases cost and complexity of the entire system.

SUMMARY

Systems and methods for stream format conversion are provided. An exemplary embodiment of a stream format conversion method comprises receiving original data transmitted in a transport stream (TS) format, converting the original data from the TS format into an elementary stream (ES) format, thereby obtaining ES format data, and generating storage data in a program stream (PS) format by inserting packetized elementary stream (PES) headers and PS headers into the ES format data.

Some embodiments of a stream format conversion method comprise converting original data from a TS format into a PES format rather than ES format, thereby obtaining PES format data. Original PES headers may remain in the storage data that is made up of PS packets. The storage data is generated by inserting either original or generated PES headers as well as PS headers into the PES format data.

Some embodiments of a stream format conversion system comprise a filter and a packet generator. The filter receives original data transmitted in a TS format, and converts the original data from the TS format into either an ES format or a PES format. The packet generator generates storage data in a PS format by inserting PES headers and PS headers into the converted data output from the filter.

An exemplary embodiment of a digital television (DTV) recorder comprises a receiver, a stream format converter, and a recorder. The receiver is operative to receive original data transmitted in a transport stream (TS) format, and output the TS format data to the stream format converter. The stream format converter comprises a filter operative to convert the original data from the TS format into either an ES or PES format, and a packet generator is operative to generate storage data in a PS format by inserting PES and PS headers into the converted data.

DESCRIPTION OF THE DRAWINGS

Systems and methods for stream format conversion can be more fully understood by reading the subsequent detailed description in conjunction with the examples and references made to the accompanying drawings, wherein.

DETAILED DESCRIPTION

Systems and methods for stream format conversion in MPEG systems are provided. The exemplary embodiments of provided systems and methods described herein convert data from a transport stream (TS) format into a program stream (PS) format without decoding and encoding the data.

Figure 1A:
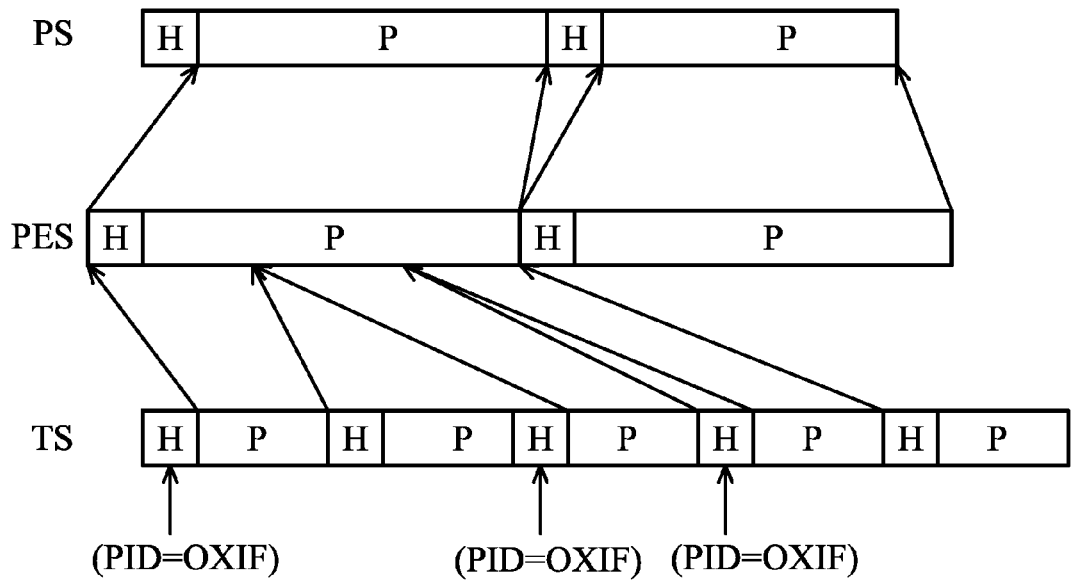
FIGS. 1A-1B illustrate the relationship between PS, PES, and TS packets.
Figure 1B:
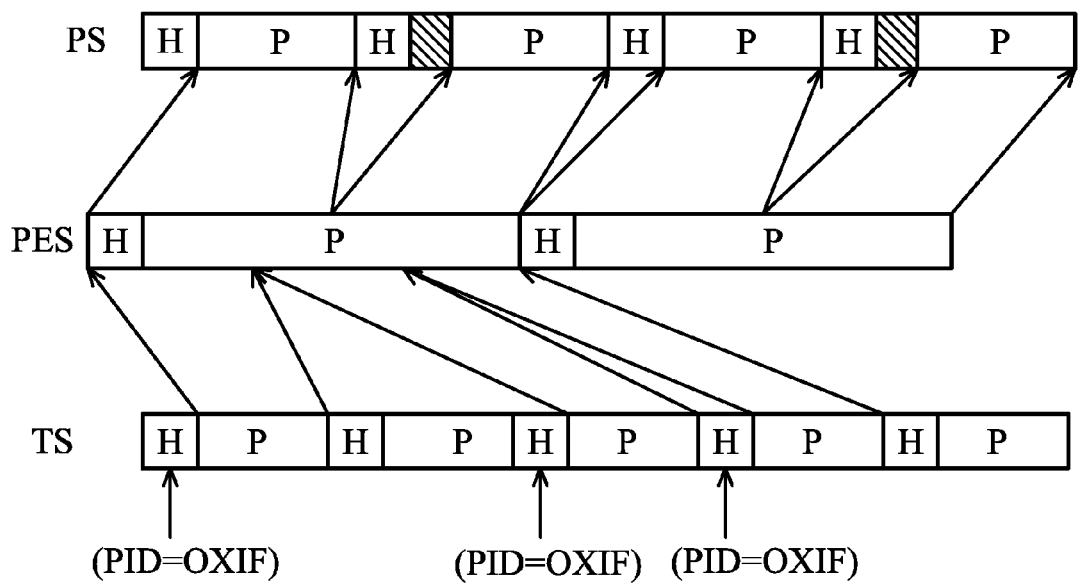

In this regard, FIG. 1 illustrates that a packetized elementary stream (PES) is a subclass of both TS and PS. In an exemplary embodiment of the stream format conversion system, original data is received in a TS format, and converted to a PES format by extracting TS payloads (P) with a specific program ID (PID) corresponding to a selected program. As shown in FIG. 1A, TS payloads corresponding to PID=0X1F are selected to form PES headers (H) and PES payloads of PES packets. Each PES packet including the header constitutes a PS payload (P). PS packets are formed by introducing separate PS headers (H) to each of PES packets. In the case of DVD-video, for example, a PES packet may be partitioned into segments that can be placed in shorter fixed-length PS packets. Referring now to FIG. 1B, there are two PES packets each of which is partitioned into two segments. The first segment including an original PES header constitutes a PS payload while the second segment is required to add a PES header to create the other PS payload. It is shown in FIG. 1B that shaded portions stand for the added PES headers.

The provided stream format conversion methods can be generally divided into two categories. The first category of methods converts data from a TS format to an elementary stream (ES) format, and inserts PES and PS headers into the ES format data to generate PS format data. The second category converts data from a TS format to a PES format, and inserts a PS header, with an original or generated PES header into each part of PES packet for generating PS format data. The methods of the first category filter the original PES headers, whereas the methods of the second category keep the original PES headers in the PS format data.

Figure 2:
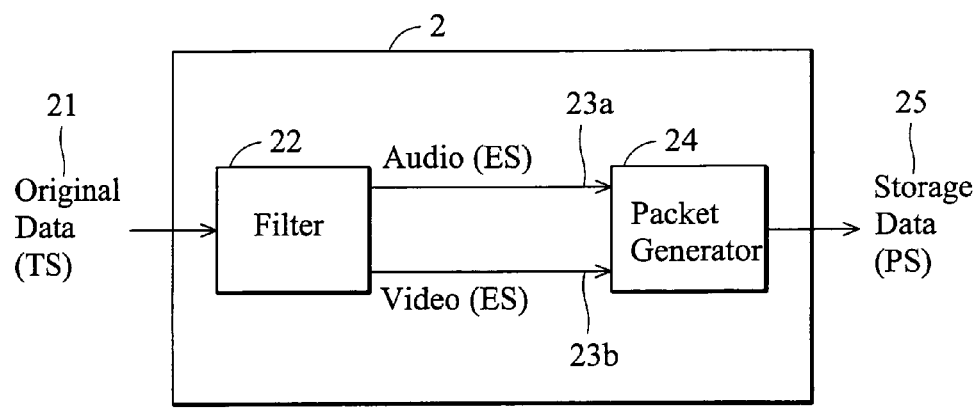
FIG. 2 is a block diagram illustrating an embodiment of a stream format conversion system.

FIG. 2 shows an embodiment of a stream format conversion system 2, which converts original data from TS to ES format first. The system 2 comprises a filter 22 and a packet generator 24. Original data in TS format 21 is transferred by a broadcast system (not shown) to the filter 22. The filter 22 receives and converts the TS format data 21 into ES format data. The ES format data comprises an audio stream 23a and a video stream 23b. The packet generator 24 generates storage data in PS format by inserting PES and PS headers into the ES format data 23a and 23b.

Figure 3:
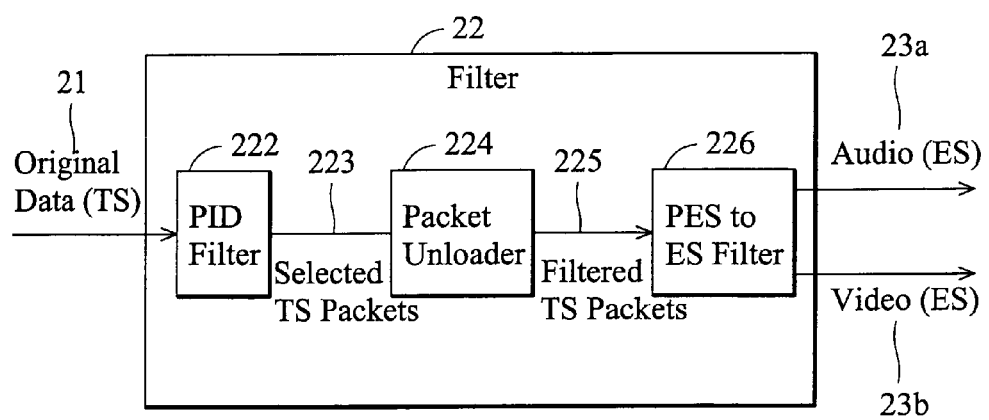
FIG. 3 is a block diagram illustrating an embodiment of a filter for a stream format conversion system.

FIG. 3 illustrates an embodiment of the filter 22 in FIG. 2. The filter 22 comprises a PID filter 222, a packet unloader 224, and a PES-to-ES filter 226. The PID filter 222 functions as a TS de-multiplexer, which collects and passes TS packets 223 with a specific PID corresponding to a selected program to the packet unloader 224. The packet unloader 224 filters out TS headers of the selected TS packets 223 and outputs filtered TS packets 225 to the PES-to-ES filter 226. The filter 226 skips PES headers and only passes ES format data 23a and 23b.

Figure 4:
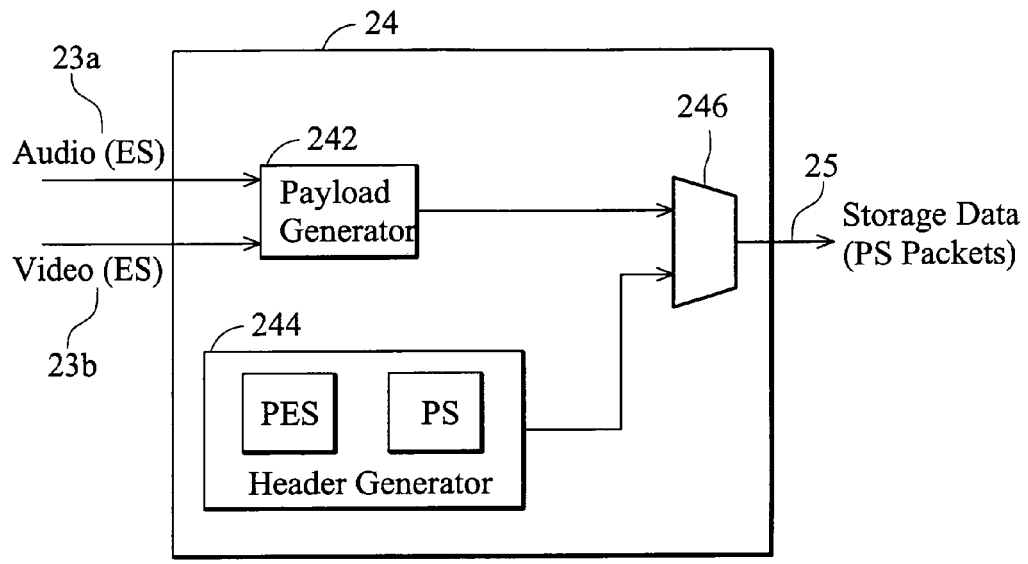
FIG. 4 is a block diagram illustrating an embodiment of a packet generator for a stream format conversion system.

FIG. 4 shows an embodiment of the packet generator 24 in FIG. 2. The packet generator 24 comprises a payload generator 242, a header generator 244, and a multiplexer 246. The payload generator 242 segments ES format data 23a and 23b into appropriate data lengths for PS payloads. The header generator 244 comprises a PES header generator and a PS header generator, and outputs a PES header and a PS header for each segmented ES format data output from the payload generator 242. The multiplexer 246 receives the PS headers from the header generator 244 as well as PS payloads from the payload generator 242. Each PS payload comprises a segmented ES format data output from the payload generator 242 and a PES header output from the header generator 244. The PES header comprises a presentation time stamp (PTS) field indicating when the decoded presentation unit is to be passed to an output device for display. PTS is used for synchronizing audio and video at the ES level. The PS header comprises a 42 bit system clock reference (SCR) field for resetting the decoder system time clock (STC). PES and PS headers also comprise standard fields such as a start code, packet length, scrambling control, and various flags.

Figure 5:
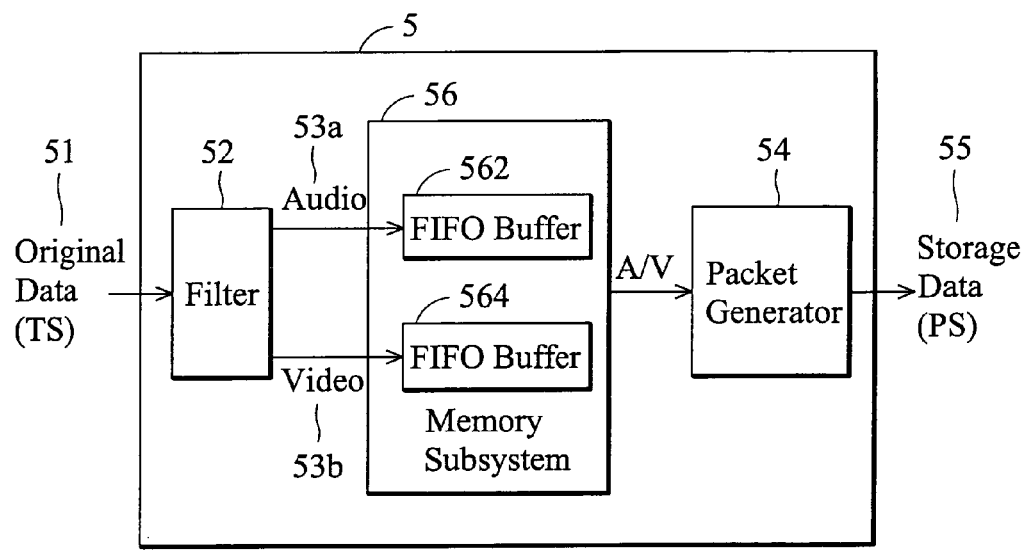
FIG. 5 is a block diagram illustrating another embodiment of a stream format conversion system.

In some embodiments, the stream format conversion system may comprise a memory subsystem coupled to the filter and the packet generator. FIG. 5 depicts an embodiment of a stream format conversion system 5 comprising a filter 52, a memory subsystem 56, and a packet generator 54. The filter 52 converts original data 51 from TS to either ES or PES format, and outputs audio 53a and video 53b data to the memory subsystem 56. For example, the memory subsystem 56 comprises two first-in-first-out (FIFO) buffers 562 and 564 for audio and video data, respectively. The memory subsystem 56 multiplexes and outputs the data stored in the two buffers 562 and 564 to the packet generator 54. The packet generator converts the audio and video data from ES or PES format into PS format, and consequently generates storage data 55 comprising PS packets.

Figure 6:
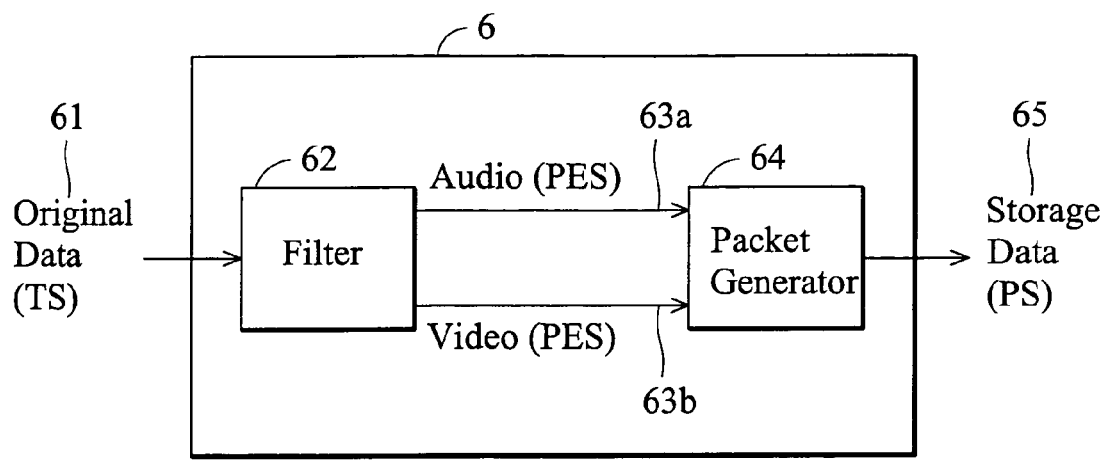
FIG. 6 is a block diagram illustrating another embodiment of a stream format conversion system.

FIG. 6 illustrates an embodiment of a stream format conversion system 6, which converts data from TS to PES format first. The system 6 comprises a filter 62 and a packet generator 64. The system 6 is similar to the system 2 in FIG. 2, however, a major difference between the two systems 6 and 2 is that the filter 62 converts the original data 61 from a TS format into a PES format. The PES format data 63a and 63b output from the filter 62 is provided to the packet generator 64 for generating storage data 65 in the PS format.

Figure 7:
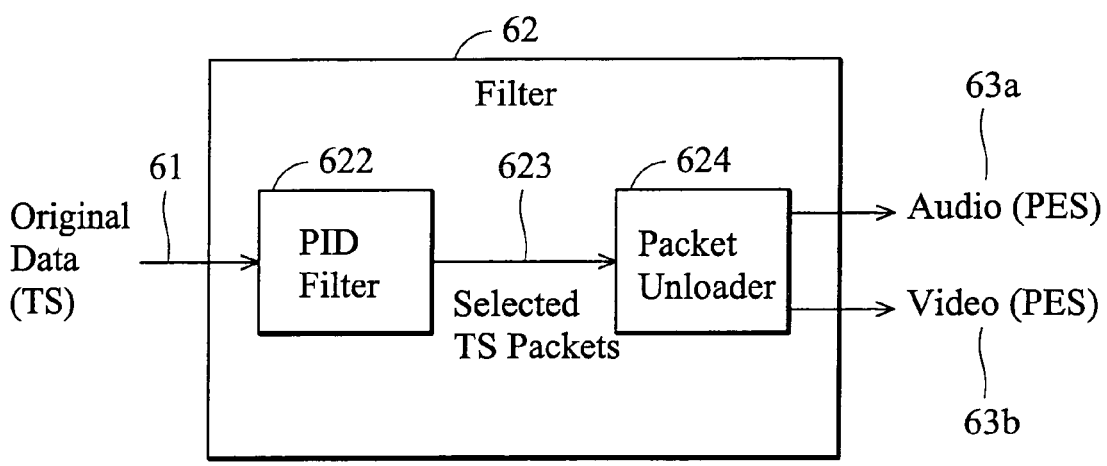
FIG. 7 is a block diagram illustrating another embodiment of a filter for a stream format conversion system.

FIG. 7 shows an embodiment of the filter 62 in FIG. 6. The filter 62 comprises a PID filter 622 and a packet unloader 624. The PID filter 622 only passes TS packets 623 with a specific PID corresponding to a program selected from the original data 61. The packet unloader 624 filters out TS headers of the selected TS packets 623 to generate PES format data 63a and 63b.

Figure 8:
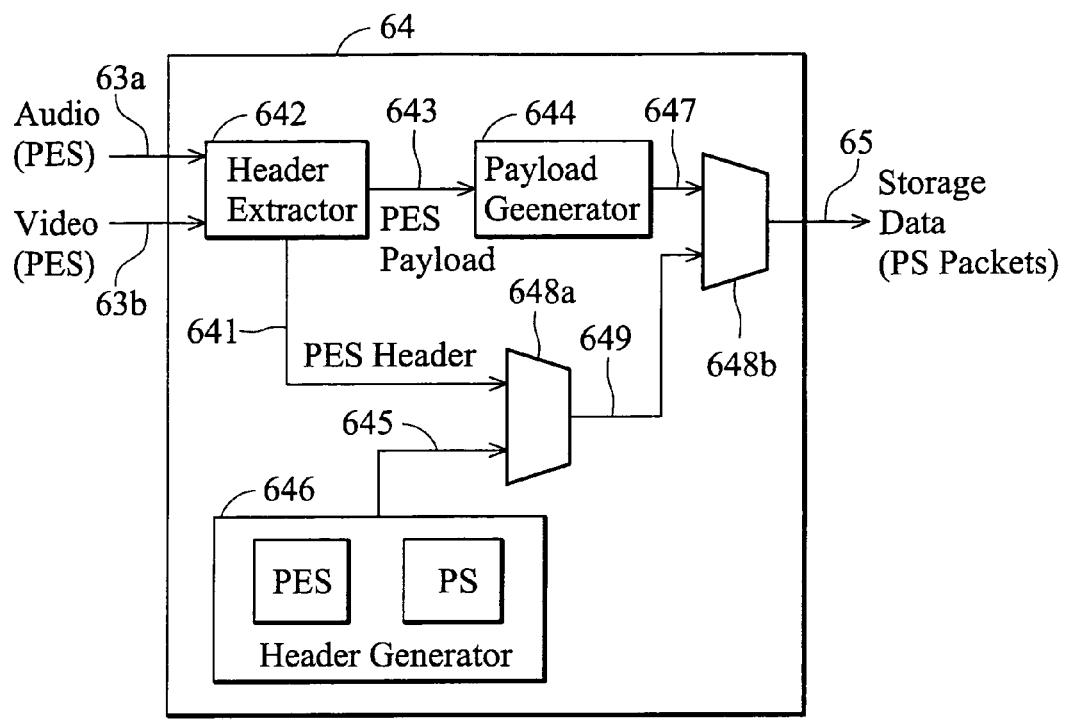
FIG. 8 is a block diagram illustrating another embodiment of a packet generator for a stream format conversion system.

FIG. 8 shows an embodiment of the packet generator 64 in FIG. 6. The packet generator comprises a header extractor 642, a payload generator 644, a header generator 646, and two multiplexers 648a and 648b. The header extractor 642 separates PES payloads 643 and PES headers 641 from the PES format data 63a and 63b. The payload generator 644 allows the PES payloads to pass through it without processing, or if necessary, divides the PES payloads into suitable-length segments that can be placed in PS packets (for example, PS packets compliant with DVD-video). The header generator 646 generates PES and PS headers. For each PES payload from the payload generator 644 over line 647, the first multiplexer 648a outputs a corresponding PS header from line 645, which is generated by the header generator 646, and either an extracted PES header from line 641 or a generated PES header from line 645. Generated PES headers are combined with the segments such that PS payloads are formed as illustrated above in FIG. 1B. The second multiplexer 648b multiplexes a PES payload from line 647 with a PS header and a PES header from line 649, thus creating a PS packet.

Figure 9:
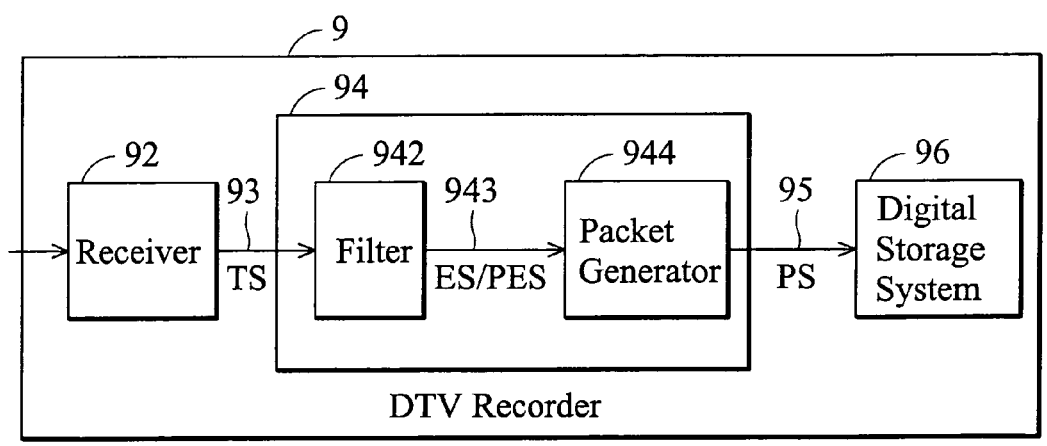
FIG. 9 is a block diagram illustrating an embodiment of a DTV recorder.

An embodiment of a digital television (DTV) recorder 9 comprising a stream format conversion system 94 is shown in FIG. 9. A receiver 92 receives broadcast data and provides original data in TS format to a filter 942. The filter 942 passes selected TS packets with a specific PID corresponding to a selected program and skips TS headers to output either PES or ES format data 943. Specifically, the ES format data is obtained by filtering out PES headers of the PES format data. The packet generator 944 then inserts PES and PS headers into the PES/ES format data 943 to generate PS packets 95. A digital storage system 96, such as a DVD or VCD recorder, stores the PS packets 95 output from the stream format conversion system 94. The DTV recorder 9 can be implemented in digital TVs, for example, for recording programs compressed in the PS format.

Figure 10:
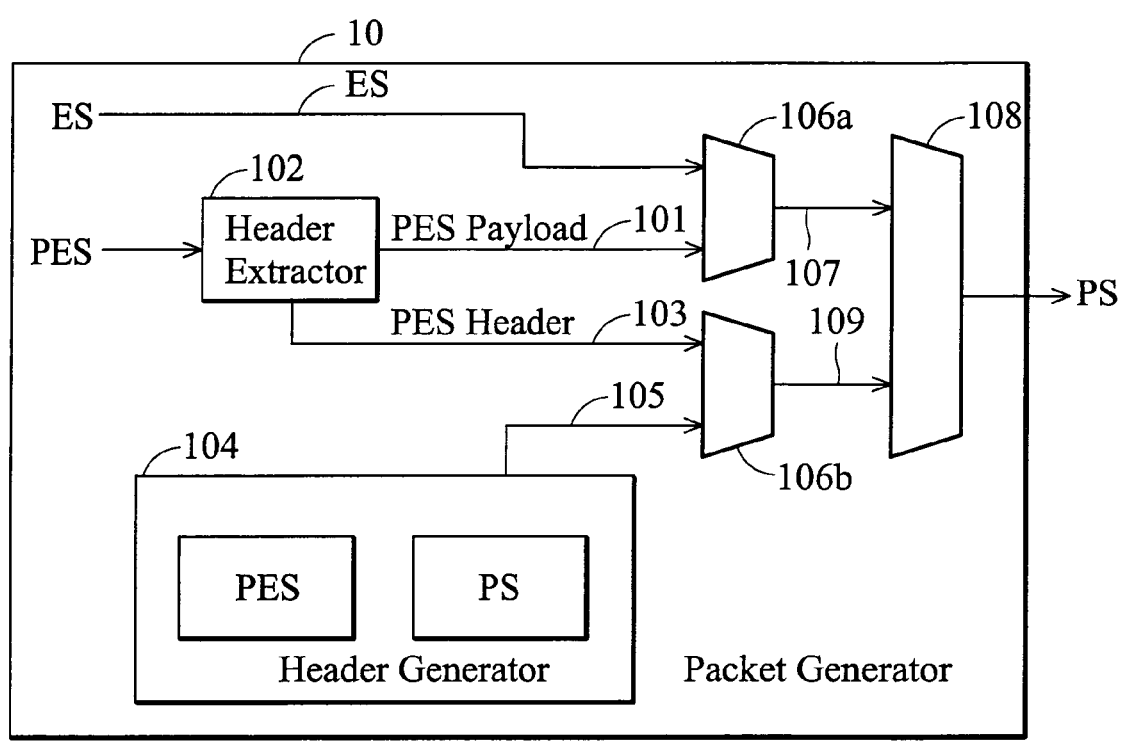
FIG. 10 is a block diagram illustrating an embodiment of a packet generator for a stream format conversion system.

An embodiment of a packet generator 10 capable of processing both ES and PES format data is shown in FIG. 10. The packet generator 10 comprises a header extractor 102, a header generator 104, and three multiplexers 106a, 106b, and 108. The header extractor 102 is disabled if the input is ES format data. The multiplexer 108 then multiplexes ES format data over line 107 and headers 109 output by the header generator 104 over line 109 to form PS packets. When the input data is in a PES format, the header extractor 102 separates PES payloads and PES headers and outputs them via line

101 and line 103, respectively. In this case, the multiplexer 106a selects the PES payload 101 as the output 107, and the multiplexer 106b outputs PES header from line 105, which is generated by the header generator 104, or the extracted PES header from line 103. Thus, headers of the PES format data are selectively replaced with generated PES headers. The output 109 of the multiplexer 106b for each PES payload over line 107 through the multiplexer 106a comprises a PS header and one of an extracted or a generated PES header. As depicted, the PS packets can thus be generated with the multiplexer 108 by combining the PES payloads from line 107 and the headers from line 109.

Those skilled in the art will be familiar with various ways of implementing the described function blocks via software, hardware, or combinations thereof.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for stream format conversion comprising:
   receiving original data transmitted in a transport stream (TS) format;
   selecting TS packets in the original data for a selected program in accordance with packet IDs (PID);
   filtering TS headers from the selected TS packets;
   filtering PES headers from the filtered TS packets to obtain elementary stream (ES) format data, the ES format data comprising an audio stream and a video stream;
   separately buffering the audio stream and the video stream;
   multiplexing the separately buffered audio and video streams to generate a merged ES format data;
   segmenting the merged ES format data; and
   generating storage data in a program stream (PS) format by inserting packetized elementary stream (PES) headers and PS headers into the segmented and merged ES format data.

2. The method according to claim 1, wherein only the TS packets with a specific PID are selected to convert into the ES format data.

3. The method according to claim 1, wherein generating the storage data further comprises:
   generating a said PES header and a said PS header for each portion of the segmented and merged ES format data to form a PS packet constituting the storage data.

4. The method according to claim 3, wherein generating the PES header comprises generating a presentation time stamp (PTS) for synchronizing audio and video of the data.

5. The method according to claim 3, wherein generating the PS header comprises generating a system clock reference (SCR) for resetting a decoder system time clock (STC).

6. A method for stream format conversion comprising:
   receiving original data transmitted in a transport stream (TS) format;
   converting the original data from the TS format into a packetized elementary stream (PES) format, thereby obtaining PES format data;
   extracting PES headers and PES payloads from the PES format data;
   dividing the PES payloads;
   generating PES headers and program stream (PS) headers; and
   inserting said PS header and a selected one of a said extracted and generated PES header to a said divided PES payload to form a PS packet constituting storage data in a PS format.

7. The method according to claim 6, wherein converting the original data from the TS format into PES format further comprises:
   selecting TS packets in the original data for a selected program in accordance with packet IDs (PID); and
   filtering TS headers from the selected TS packets to output the PES format data.

8. The method according to claim 7, wherein only the TS packets with a specified PID are selected to form the PES format data.

9. The method according to claim 6, wherein generating the PES header comprises generating a presentation time stamp (PTS) for synchronizing audio and video.

10. The method according to claim 6, wherein generating the PS header comprises generating a system clock reference (SOR) for resetting a decoder system time clock (STC).

11. The method according to claim 6, wherein the PES format data comprises an audio stream and a video stream.

12. The method according to claim 6, further comprising buffering the PES format data.

13. The method according to claim 12, wherein the PES format audio and video data are separately buffered and multiplexed for generating the storage data.

14. A system for stream format conversion, comprising:
   a filter, operative to receive original data transmitted in a transport stream (TS) format, and convert the original data from the TS format into an elementary stream (ES) format thereby obtaining ES format data, wherein the filter comprises:
      a PID filter, operative to select TS packets in the original data for a selected program in accordance with packet IDs (PID);
      a packet unloader, operative to filter TS headers in the selected TS packets output from the PID filter; and
      a PES-to-ES filter, operative to filter PES headers in the filtered TS packets output from the packet unloader, and output the ES format data, the ES format data comprising an audio stream and a video stream;
   a memory subsystem, separately buffering the audio stream and the video stream output from the filter, and multiplexing the separately buffered audio and video streams to generate a merged ES format data;
   a payload generator, segmenting the merged ES format data;
   a header generator, generating a PES header and a PS header for each of the segmented and merged ES format data; and
   a multiplexer coupled to the payload generator and the header generator, forming program stream (PS) packets to be storage data in a PS format, wherein each of the PS packets comprises a said PES header, a said PS header and one of the segmented and merged ES format data.

15. The system according to claim 14, wherein the PID filter selects the TS packets with a specified PID for transfer to the packet unloader.

16. A system for stream format conversion, comprising:
   a filter, operative to receive original data transmitted in a transport stream (TS) format, and convert the original data from the TS format into a packetized elementary stream (PES) format thereby obtaining PES format data;
   a header extractor, extracting PES headers and PES payloads from the PES format data;
   a payload generator, dividing the PES payloads;

a header generator, generating PES headers and PS headers; and at least a multiplexer, coupled to the header extractor, the payload generator and the header generator, inserting a said PS header and a selected one of a said extracted and generated PES header to a said divided PES payload to form a PS packet constituting storage data in a PS format.

17. The system according to claim 16, wherein the filter further comprises:

a PID filter, operative to select TS packets in the original data for a selected program in accordance with packet IDs (PID); and a packet unloader, operative to filter TS headers from the selected TS packets output from the PID filter and output the PES format data.

18. The system according to claim 17, wherein the PID filter selects the TS packets with a specified PID for transfer to the packet unloader.

19. The system according to claim 16, wherein the filter outputs the PES format data comprising an audio stream and a video stream.

20. The system according to claim 16, further comprising a memory subsystem coupled between the filter and the header extractor and operative to buffer the PES format data.

21. The system according to claim 20, wherein the memory subsystem separately buffers the PES format audio and video data and outputs alternately to the header extractor.

22. A digital television (DTV) recorder, comprising:

means for receiving original data transmitted in a transport stream (TS) format; and means for stream format conversion, comprising:

means for converting the original data from the TS format into an elementary stream (ES) format or a packetized elementary stream (PES) format, thereby obtaining converted data comprising an audio stream and a video stream;

means for separately buffering the audio stream and the video stream;

means for multiplexing the separately buffered audio and video streams to generate merged converted data;

means for segmenting the merged converted data; and means for generating storage data in a program stream (PS) format by inserting packetized elementary stream (PES) headers and PS headers into the segmented and merged converted data; and means for recording the storage data in the PS format.

23. The DTV recorder according to claim 22, wherein the means for converting further comprises:

means for selecting TS packets in the original data for a selected program in accordance with packet IDs (PID); and means for filtering TS headers from the selected TS packets.

24. The DTV recorder according to claim 23, wherein the means for converting further comprises means for filtering PES headers in the filtered TS packets.

25. The DTV recorder according to claim 24, wherein the means for generating storage data further comprises:

means for generating a said PES header and a said PS header for each portion of the segmented and merged converted data to form a PS packet constituting the storage data.

26. The DTV recorder according to claim 23, wherein the means for generating storage data further comprises:

means for extracting PES headers and PES payloads from the segmented and merged converted data;

means for dividing the PES payloads;

means for generating PES headers and PS headers; and means for combining a said generated PS header and a selected one of a said extracted and generated PES header with a said divided PES payload to form a PS packet constituting the storage data

* * * * *